United States Patent [19]

Utsumi

[11] Patent Number: 4,804,736

[45] Date of Patent: Feb. 14, 1989

[54] POLYETHYLENE-2,6-NAPHTHALATE FILM FOR MAGNETIC RECORDING TAPES

[75] Inventor: Shigeo Utsumi, Yokohama, Japan

[73] Assignee: Diafoil Company, Limited, Tokyo, Japan

[21] Appl. No.: 939,683

[22] Filed: Dec. 9, 1986

[30] Foreign Application Priority Data

Dec. 9, 1985 [JP] Japan ................... 60-276646

[51] Int. Cl.$^4$ ............... C08G 63/00; C08G 63/22; B32B 27/06
[52] U.S. Cl. .................. 528/176; 428/480; 428/409; 428/694; 427/129; 264/177.19
[58] Field of Search ............ 528/176; 428/480, 409, 428/694; 427/129; 264/177.19

[56] References Cited

U.S. PATENT DOCUMENTS

| | | | |
|---|---|---|---|
| 3,821,156 | 6/1974 | Farrar | 523/181 |
| 4,202,927 | 5/1980 | Yamaguchi et al. | 428/480 |
| 4,316,927 | 2/1982 | Kimura et al. | 428/216 |
| 4,461,797 | 7/1984 | Adachi et al. | 428/147 |
| 4,497,865 | 2/1985 | Minami et al. | 428/336 |

FOREIGN PATENT DOCUMENTS

| | | |
|---|---|---|
| 0008679 | 3/1980 | European Pat. Off. |
| 0124291 | 11/1984 | European Pat. Off. |
| 2046754 | 3/1971 | France |
| 50-3112 | 1/1975 | Japan |
| 50-100174 | 8/1975 | Japan |
| 50-102303 | 8/1975 | Japan |

OTHER PUBLICATIONS

European Search Report (Apr. 28, 1987).

*Primary Examiner*—Harold D. Anderson
*Assistant Examiner*—Dennis R. Daley
*Attorney, Agent, or Firm*—Oblon, Fisher, Spivak, McClelland & Maier

[57] ABSTRACT

Disclosed herein is a polyethylene-2,6-naphthalate film suitable for magnetic recording tapes and, in particular, a polyethylene-2,6-naphthalate film suitable for a base film of high-density magnetic recording tapes, having a Young's modulus of not less than 800 kg/mm$^2$ in the machine direction (the longitudinal direction) and of not less than 600 kg/mm$^2$ in the transverse direction.

15 Claims, No Drawings

POLYETHYLENE-2,6-NAPHTHALATE FILM FOR MAGNETIC RECORDING TAPES

BACKGROUND OF THE INVENTION

The present invention relates to a polyethylene2,6-naphthalate film for magnetic recording tapes. More particularly, the present invention relates to a polyethylene2,6-naphthalate film which is suitable for a base film of very thin and high-density magnetic recording tapes, having a Young's modulus of not less than 800 kg/mm$^2$ in the machine direction and a Young's modulus of not less than 600 kg/mm$^2$ in the transverse direction, being free from the bleeding of oligomers, and being excellent in heat resistance.

Demand for a longer-time recording magnetic tape, and a reduction in size and weight of recording apparatus has recently been increasing, so development of a magnetic recording tape which is thinner than a conventional one and has a sufficient strength has been waited in expectation.

To meet such demand, a polyethylene terephthalate film which has been strengthened in the machine direction has been used as a base film of a magnetic recording tape. However, the molecular structure of polyethylene terephthalate film strengthened in the machine direction makes it difficult to provide a film having a Young's modulus of not less than 800 kg/mm$^2$ in the machine direction, and since it is difficult to increase the strength in the transverse direction, it is difficult to produce a film of not more than 7 μm thick having a sufficient strength. A high-density magnetic recording tape having a track recording density of not less than 10,000 cycle/cm such as 8 m/m video tape, digital audio tape, high-band video tape and digital video tape is required to have a very small surface roughness as compared to the conventional magnetic recording tape, therefore the film for a high-density magnetic recording tape must be free from the bleeding of oligomers. In a polyethylene terephthalate film, however, the bleeding of oligomers is inevitable during the stretching step, the heat setting step or in the vacuum evaporation (deposition) or cooling step for manufacturing a magnetic tape, which results in a drop out, and an improvement has been demanded.

Especially, when a magnetic recording tape is manufactured by forming a magnetic layer on a base film by deposition, a film which has higher heat resistance than a terephthalate film has been demanded.

On the other hand, since polyethylene-2,6-naphthalate which has a naphthalene ring in a molecular chain has a rigid molecular structure and exhibits a high crystallizability, a film formed therefrom is expected to be excellent in heat resistance, mechanical strength and dimensional stability, and a magnetic recording tape adopting a polyethylene-2,6-naphthalate film as a base film and the process for producing the same have already been proposed (Japanese Patent Publication No. 48-29541 (1973), Japanese Patent Application Laying-Open (KOKAI) No 50-45877 (1975) and Japanese Patent Publication No. 56-19012 (1981)). However, any of these polyethylene-2,6-naphthalate films disclosed in the prior art do not exhibit a high Young's modulus both in the machine direction or in the transverse direction, and it cannot be said the polyethylene-2,6-naphthalate films of the prior art have adequate strength both in the machine direction and in the transverse direction.

The present inventor has made various researches to provide a film having an adequate strength both in the machine direction and in the transverse direction, which is required for a base film of a very thin and high-density magnetic tape, even if the film is as thin as not more than 7 μm. As a result of the research, it has been found that a film having a density of 1.360 g/cm$^3$ obtained by the biaxial stretching of polyethylene-2,6-naphthalate having an intrinsic viscosity of not less than 0.40 exhibits a Young's modulus of not less than 800 kg/mm$^2$ in the machine direction and a Young's modulus of not less than 600 kg/mm$^2$ in the transverse direction, is free from the bleeding of oligomers and excellent in the dimensional stability. The present invention has been accomplished on the basis of this finding.

SUMMARY OF THE INVENTION

In the first aspect of the present invention, provided there is a polyethylene-2,6-naphthalate film for high-density magnetic tapes which is excellent in heat resistance and which has a Young's modulus of not less than 800 kg/mm$^2$ in the machine direction and a Young's modulus of not less than 600 kg/mm$^2$ in the transverse direction.

In the second aspect of the present invention, provided there is a process for producing a polyethylene-2,6-naphthalate film for high-density magnetic tapes being excellent in heat resistance and having a Young's modulus of not less than 800 kg/mm$^2$ in the machine direction and a Young's modulus of not less than 600 kg/mm$^2$ in the transverse direction, which comprises the steps of:

melt-extruding polyethylene-2,6-naphthalate of an intrinsic viscosity of not less than 0.40 which contains 0.01 to 1 wt % of inactive fine particles having a primary particle diameter of 0.001 to 10 μm into a film, stretching the film by 1.1 to 3.5 times in the machine direction at a temperature of 120° to 170° C., stretching the film by 2.5 to 5.0 times in the transverse direction at a temperature of 120° to 180° C., heatsetting the film at a temperature of 130° to 240° C. while subjecting the film to relaxation in the transverse direction by 1 to 30%, re-stretching the film in the machine direction at a temperature of 140° to 200° C. by 1.5 to 2.8 times if the film has been stretched in the machine direction by 1.1 to 3.5 times in the previous stage and by 1.05 to 1.35 times if the film has been stretched in the machine direction by 3.5 to 5.0 times in the previous stage, heatsetting the film at a temperature of 180° to 260° C., and winding the film while subjecting the film to relaxation by 1 to 10% in the machine direction and in the transverse direction.

In the third aspect of the present invention, provided there is a magnetic recording tape comprising a polyethylene-2,6-naphthalate film having a Young's modulus of not less than 800 kg/mm$^2$ in the machine direction and a Young's modulus of not less than 600 kg/mm$^2$ in the transverse direction, and a magnetic layer formed on the surface of said polyethylene-2,6-naphthalate film.

DETAILED DESCRIPTION OF THE INVENTION

The present invention provides a polyethylene-2,6-naphthalate film for high-density magnetic recording tapes which has a Young's modulus of not less than 800 kg/mm² in the machine direction and a Young's modulus of not less than 600 kg/mm² in the transverse direction and which is excellent in heat resistance.

The high-density magnetic recording tape in the present invention means a magnetic recording tape having a track recording density of 10,000 (cycle/cm) such as, for example, an 8 m/m video tape, high-band video tape, digital video tape and digital audio tape.

Polyethylene-2,6-naphthalate in the present invention means a polymer in which the constitutional unit of molecule substantially comprises ethylene-2,6-naphthalate unit, and includes modified ethylene-2,6-naphthalate polymers which are modified with a slight amount of, for example, less than 10 mol %, preferably less than 5 mol % of a third component.

Polyethylene-2,6-naphthalate is generally prepared by polycondensing naphthalene-2,6-dicarboxylic acid or a derivative thereof such as dimethyl naphthalene-2,6-dicarboxylate and ethylene glycol in the presence of a catalyst under an appropriate reaction condition. As the third component used for obtaining a modified polymer, dicarboxylic acids such as adipic acid, oxalic acid, isophthalic acid, terephthalic acid, naphthalene-2,7-dicarboxylic acid and diphenyl ether dicarboxylic acid or lower alkyl esters thereof; oxycarboxylic acids such as p-oxybenzoic acid and p-oxyethoxybenzoic acid or lower alkyls thereof; diols such as propylene glycol, trimethylene glycol, tetramethylene glycol, pentamethylene glycol, hexamethylene glycol and diethylene glycol; and polyalkylene glycol such as polyethylene glycol and polytetramethylene glycol are exemplified. In polymerization, a stabilizer such as phosphoric acid, phosphorous acid and ester thereof; an antioxidant such as hindered phenol; a polymerization modifier; a crystallization modifier such as higher aliphatic carboxylic acid; and a plasticizer may be added in the range in whihh the characteristics of a polyethylene-2,6-naphthalate film of the present invention are not impaired Since too low a degree of polymerization of a polyethylene-2,6-naphthalate lowers the mechanical strength of the film, it is preferable that the polymer has an intrinsic viscosity (measured in the mixed solvent of phenol and 1,1,2,2-tetrachloroethane (1 : 1) at a temperature of 30.0° C.) of not less than 0.4, preferably 0.4 to 0.9, and more preferably 0.5 to 0.7.

In order to make a magnetic tape made from the film according to the present invention run smoothly, it is necessary to provide an appropriate roughness on the surface of the film by adding inactive (inert) fine particles. One of the methods of adding inactive fine particles into the film is deposited particle method, in which a metal compound which is dissolved in a reaction system is reacted with a phosphoric compound during the preparation of polyethylene-2,6-naphthalate, for example, after the ester interchange reaction. This method is preferable because it produces little coarse particles.

A particle addition method is an easier method for adding inactive fine particles. This is a method of mixing inactive fine particles in a step between the step for preparing polyethylene-2,6-naphthalate and the step for extruding for the film formation. As the inactive fine particles, fine particles of kaolin, talc, silica, magnesium carbonate, calcium carbonate, barium carbonate, calcium sulfate, barium sulfate, lithium phosphate, calcium phosphate, magnesium phosphate, aluminum oxide, silicon oxide, titanium oxide, lithium fluoride, Ca, Ba, Zn and Mn salts of terephthalic acid and carbon blacks are exemplified. Such inactive fine particles may be used singly or used as mixture of two or more members selected from the above described group. The inactive fine particles may be spherical, bulky, or flaky in shape, and there is no special restriction in the hardness, specific gravity, color or the like of the inactive fine particles, either. The primary particle diameter of the inactive fine particles is 0.001 to 10 $\mu$m, preferably 0.001 to 3 $\mu$m. The amount of the inactive fine particles to be mixed to the film is 0.01 to 1 wt %, preferably 0.02 to 0.8 wt %, and more preferably 0.03 to 0.5 wt %.

The center line average roughness Ra of a film for high-density magnetic recording tapes having a track recording density of 10,000 cycle/cm is preferably not more than 0.008 $\mu$m. Een if Ra is not more than 0.008 $\mu$m, a coarse protuberance causes a drop out. Therefore, the surface of the film must contain no protuberance of not less than 0.81 $\mu$m per 200 cm² In order to avoid coarse protuberance from a polyethylene terephthalate film, a method of filtering out coarse particles through a filter in the melt-extrusion step for film formation is generally adopted. In the case of a polyethylene naphthalate film, however, since the melt viscosity is high, it is difficult to make the pressures difference before and after the filter so much as in the case of a polyethylene terephthalate film. Therefore, it is preferable to remove coarse particles before the melt-extrusion step for film formation. In the present invention, filtration may be carried out in the extruder after pelletization of the prepared polymer, but in terms of productivity the prepared polymer is preferably directly introduced into the extruder in a molten state and filtered before pelletization. The filter is preferably a leaf type filter which has a large filtration area. Woven wire, sintered woven wire, or sintered metal filter may be preferably used. Granular Filters made of fillers of such as metal grains, sand, glass beads and wire are not preferable because such filters are difficult to reuse. The mesh size of the filter is different depending on the kind of a magnetic recording tape, but is preferably 100 to 10,000 mesh. Particularly, in the case of the film for an 8 m/m video tape, the mesh size is preferably 1,000 to 10,000 mesh.

The Young's modulus of a polyethylene-2,6naphthalate film according to the present invention is not less than 800 kg/mm², preferably 1,000 kg/mm² and more preferably 1,300 kg/mm² in the machine direction. If the Young's modulus in the machine direction is less than 800 kg/mm², it is difficult to obtain a practicably thin film of not more than 7 $\mu$m in thickness.

The polyethylene-2,6-naphthalate film according to the present invention has a high strength not only in the machine direction but also in the transverse direction. The Young's modulus in the transverse direction is not less than 600 kg/mm², preferably not less than 650 kg/mm². If the strength in the transverse direction is low, a magnetic recording tape formed of such a film of, e.g., not more than 7 $\mu$m thick is likely to be wrinkled at the edge, or to be broken or bent during running in a recording apparatus. Therefore, the high strength in the transverse direction is a very important property.

The density of a polyethylene-2,6-naphthalate film according to the present invention is preferably not less than 1.360 g/cm³, preferably 1.370 g/cm³. Small density deteriorates the dimensional stability. In order to maintain the dimensional stability of the film, the film must have a shrinkage of not more than 5%, preferably not more than 3% and more preferably not more than 2% after having been heat-treated at 150° C. for 30 minutes.

The polyethylene-2,6-naphthalate film according to the present invention may be formed into a given thickness according to purpose. In the case of using as the base film of a very thin and high-density magnetic recording tape, the thickness thereof is preferably not more than 7 μm, more preferably 2 to 7 μm and still more preferably 3 to 5 μm.

The polyethylene-2,6-naphthalate film according to the present invention which is suitable for the base film of a high-density magnetic recording tape may be produced, for example, in the following process.

Polyethylene-2,6-naphthalate containing inactive fine particles is prepared by an ordinary method, and is preferably introduced into an extruder in a molten state, in which coarse particles are filtered out, and is thereafter formed into pellets. A pellet is dried, melt-extruded at 280° to 320° C. and cooled to be hardened, thereby obtaining an unstretched film of substantially non-orientation. It is preferable to filter the molten pellet during melt-extrusion. It is also preferable to use a multi-stage filter, if necessary. When cooling the extruded the unstretched film for hardening, a known method for bringing a film into close contact with a casting drum, above all, electrostatic cooling method is preferably adopted. The unstretched film is first stretched in the machine direction by 1.1 to 5.0 times, preferably 1.5 to 3.5 times at a temperature of 120° to 170° C. At this time, it may be stretched either at one stage or multi-stages. The film obtained in this way is next stretched in the transverse direction by a tenter by 2.5 to 5.0 times at a temperature of 120° to 180° C. In order to lessen the non-uniform portions in thickness in the transverse direction, the film is preferably stretched in the range of 3.5 times to 5.0 times. The biaxially oriented film obtained in this way is heat-treated at 130° to 240° C. while subjecting it to relaxation in the transverse direction by 1 to 30%. The thus heat-treated film is re-stretched in the machine direction at 140° to 200° C. by 1.5 to 2.8 times if it has been stretched in the machine direction by 1.1 to 3.5 times in the previous stage, or by 1.05 to 1.35 times if it has been stretched in the machine direction by 3.5 to 5.0 times in the previous stage. The thus treated film is heatset at a temperature of 180° to 260° C. for 1 sec to 10 min, preferably further stretching in the transverse direction by 1.03 to 1.5 times. Thereafter, while being subjected to relaxation both in the machine direction and in the transverse direction by 1 to 10% in a cooling zone, the polyethylene-2,6-naphthalate produced is wound.

The polyethylene-2,6-naphthalate film obtained in this way has a Young's modulus of not less than 800 kg/mm² in the machine direction, a Young's modulus of not less than 600 kg/mm² in the transverse direction, a center line average roughness Ra of not more than 0.008 μm, no protuberance of not less than 0.81 μm per surface of 200 cm², and a heat shrinkage of not more than 5% both in the machine direction and in the transverse direction after it has been heattreated at 150° C. for 30 min. Thus, the polyethylene-2,6naphthalate film according to the present invention has characteristics suitable as a base film of a high-density magnetic recording tape, especially a very thin high-density magnetic recording tape of not more than 7 μm in thickness.

A magnetic recording tape in which the polyethylene2,6-naphthalate film according to the present invention is used as a base film may be produced by forming a magnetic layer of an iron oxide, chrome oxide or the like on the surface of the polyethylene-2,6-naphthalate film according to the present invention by a known deposition method, coating method, etc.

The present invention will be explained in more detail with reference to the following non-limitative examples. The physical properties of the films obtained in the examples, production of a magnetic recording tape and measurement of the running nature and drop out of the films obtained are measured as follows (1) Young's modulus Young's modulus was measured at 25° C. and 50% RH by a Tensilon UTM-III produced by Toyo Boldwin Co., Ltd. under the following conditions:
sample: film of 15 cm long and 1 cm wide
space between chucks: 10 cm
rate of pulling: 100 %/min (2) Heat shrinkage The heat hrinkage was measured after a sample had been left at 150° C. for 30 minutes in a non-stretched state in an oven. The heat shrinkage was obtained by $[(l_0-l)/l_0] \times 100$ (%), wherein $l_0$ is the original length and $l$ is the measured length.

(3) Center line average roughness (Ra : μm)

The surface roughness was obtained in the following way by using a surface roughness measuring machine (SE-3FK) produced by Kosaka Kenkyusho. The radius of the tip of the contact needle was 2 μm, and the load was 30 mg. From the surface curve of the film, a portion of a length of L (2.5 mm) was sampled along the direction of the center line. The roughness curve is represented by $y = f(x)$ by assuming the center line of the sampled portion as the axis X and the direction perpendicular thereto as the axis Y, and the surface roughness (μm) is obtained from the following formula:

$$Ra = \frac{1}{L} \int_0^L |f(x)| dx$$

Values above 80 μm were cut off. Ra was obtained by the average value at 5 points in the machine direction and 5 points in the transverse direction, namely, at 10 points in total.

(4) Number of coarse protuberances

The film was placed under crossed Nicols and observed in 10 X magnification. The shining fish-eye portions were marked and the height of each of the fish-eye portions was measured by a double beam method. The number of the protuberances having a height of not less than 0.81 μm was counted with respect to 200 cm². This was regarded as the number of coarse protuberances.

(5) Production of a magnetic recording tape

Ferromagnetic alloy powder (Fe-Co): 300 parts by weight
Zinc powder (average particle diameter: 2 μm): 25 parts by weight
Cellulose acetate butyrate: 30 parts by weight
Epoxy resin: 25 parts by weight
Silicone oil: 4 parts by weight
Lecithin: 5 parts by weight
Toluene (solvent): 200 parts by weight
Methyl ethyl ketone (solvent): 200 parts by weight Ethyl acetate (solvent): 100 parts by weight A composition of the above-described components were charged into a ball mill to be sufficiently kneaded 180 parts by weight of polyisocyanate compounds (Desmodur L-75) was added thereto and the mixture was agitated for 30 minutes. The mixture was applied on one of the surfaces of a polyethylene naphthalate film according to the present invention to a thickness of 4 μm in the dried state while applying a magnetic field. After the thus-coated film was dried, the applied mixture was hardened and planished. Thereafter, a composition consisting of the following components were kneaded in a ball mill. The mixture was applied on the other surface of the film to a thickness of 1 to 3 μm and dried to provide a back coat layer. The film was slit to a width of 1/2 inch to obtain a magnetic recording tape.

Composition of the back coat layer

Nitrocellulose: 30 parts by weight

Epichmen H 350 (epoxy resin): 18 parts by weight

Coronate L (polyisocyanate compound): 12 parts by weight

Titanium oxide KA-10 (titanium oxide powder produced by Titanium Industries Ltd.): 16 parts by weight Mitsubishi N-600B (carbon black produced by Mitsubishi Chemical Industries Ltd.): 24 parts by weight Methyl isobutyl ketone: 150 parts by weight Ethyl acetate: 80 parts by weight Toluene: 70 parts by weight (6) Running property of a magnetic recording tape A magnetic recording tape was run at a speed of 10 cm/sec by using a video tape recorder, while repeating the starting and stopping operations. The edge of the tape was observed after a 100-hour running.

(7) Drop out

The number of drop outs per 5.7 m length of a recording tape was counted by a drop-out counter produced by Nihon Jido Seigyo K.K.

EXAMPLES 1, 2 AND 3 AND COMPARATIVE EXAMPLE 1

[Preparation of Polyethylene-2,6-Naphthalate]

100 parts of dimethyl naphthalene-2,6-dicarboxylate, 60 parts of ethylene glycol and 0.1 part of calcium acetate mono hydrate were charged into a reactor to carry out ester interchange reaction. The temperature was 180° C. initially, and the temperature was gradually raised with the distillation of methanol until the temperature reached 230° C. after 4 hours, thereby completing the ester interchange reaction.

After 0.04 part of phosphoric acid was added to the reaction mixture, 0.30 part of titanium carbonate having a primary particle diameter of 0.3 μm and 0.04 part of antimony trioxide were added thereto to carry out polycondensation by an ordinary method. The temperature was gradually raised and the pressure was gradually reduced from atmospheric pressure with the rise of the temperature until the temperature reached 290° C. and the pressure 0.3 mmHg after 2 hours.

When 4 hours had passed from the initiation of the reaction, the reaction was stopped to discharge polyethylene-2,6-naphthalate under a nitrogen pressure. The molten polymer was directly introduced to an extruder and after the filtration through a filter of 2,500 mesh, the molten polymer was extruded in the form of a strand and cut into pellets. The intrinsic viscosity of the polyethylene-2,6-naphthalate obtained was 0.68.

[Production of a Polyethylene-2,6-Naphthalate Film]

The thus-obtained polyethylene-2,6-naphthalate pellet was dried and extruded at 295° C. by an extruder into an amorphous film by using electrostatic cooling method, while being filtered through a two-stage filter of 2,000 mesh and 2,500 mesh. The thus obtained amorphous film was stretched in the machine direction by 2.6 times at 145° C. and in the transverse direction by 4.2 times at 135° C. The stretched film was heatset at 210° C. while being subjected to relaxation by 10%. The heatset film was re-stretched at 160° C. in the machine direction by 1.9 times (Example 1), 2.3 times (Example 2), 2.7 times (Example 3), and 2.9 times (Comparative Example 1). Thereafter, while tentering the film by 1.1 times in the transverse direction, the film was heatset at 220° C., thereafter, wound while being subjected to relaxation in the machine and the transverse directions by 4%. The thickness of each of the thus obtained polyethylene-2,6-naphthalate films was 4.5 μm.

The physical properties of the films and the characteristics of the magnetic recording tape obtained from each film are shown in Table 1. The film in Comparative Example 1 was frequently broken and it was impossible to form a satisfactory film.

EXAMPLE 4

The polymerization in Example 1 was repeated except that 1.5 parts of silica having a primary particle diameter of 0.03 μm was added in place.of 0.30 part of titanium oxide having a primary particle diameter of 0.3 μm to produce a polyethylene-2,6-naphthalate pellet A having an intrinsic viscosity of 0.45. A polyethylene-2,6-naphthalate pellet B having an intrinsic viscosity of 0.45 was produced by the same polymerization as in Example 1 except that 300 ppm of calcium carbonate having a primary particle diameter of 0.5 μm was added in place of 0.30 part of titanium oxide having a primary particle diameter of 0.3 μm. A polyethylene-2,6-naphthalate pellet C having an intrinsic viscosity of 0.70 was produced by the same polymerization as in Example 1 except for using no titanium oxide having a primary particle diameter of 0.3 μm.

The pellets A and B were individually dried, extruded by an extruder having a filter of 2,500 mesh to be cut into pellets again, and thereafter subjected to solid phase polymerization, thereby obtaining pellets A' and B' having an intrinsic viscosity of 0.65.

The pellets A', B' and C were blended in the ratio of 20:20:60 and by using this blended material, a polyethylene-2,6-naphthalate film of a thickness of 4.5 μm was obtained by the same process as in the production of a film in Example 3. The physical properties of the film and the characteristics as a magnetic recording tape are shown in Table 1.

EXAMPLES 5 AND 6 AND COMPARATIVE EXAMPLE 2

An unstretched film produced in the same way as in Example 4 was stretched in the machine direction by 4.2 times at 130° C. and in the transverse direction by 4.2 times at 140° C. After heatsetting the film at 180° C., the film was further stretched in the machine direction at 170° C. by 1.2 times (Example 5), 1.3 times (Example 6) and 1.4 times (Comparative Example 2). Each of the biaxially oriented films was heatset at 220° C. and wound while subjecting to relaxation by 5% both in the machine direction and in the transverse direction. The thickness of the thus obtained polyethylene-2,6-naphthalate films was 4.5 μm. The physical properties of these films and the characteristics as a magnetic recording tape are shown in Table 1. The film in Comparative Example 2 was frequently broken and it was impossible to form a satisfactory film.

Comparative Example 3

The process of Example 1 was repeated except that the re-stretching ratio of the film in the machine direction was 1.4 times to obtain a polyethylene-2,6-naphthalate film of 4.5 μm thick. The physical properties of the film are also shown in Table 1.

Comparative Example 4

[Preparation of Polyethylene-2,6-Naphthalate]

Polyethylene-2,6-naphthalate was produced in the same way as in Example 1 except that the polymer was formed into pellets without being subjected to filtration. The intrinsic viscosity of the product was 0.62.

[Production of a Polyethylene-2,6-Naphthalate Film]

An unstretched film was produced in the same way as in Example 1 except that the filter of 1,000 mesh was used. The film was stretched in the machine direction by 4.1 times at 135° C. and in the transverse direction by 3.0 times at 125° C., and was heatset at 170° C. The film was re-stretched in the machine direction by 1.5 times at 160° C., and was heatset at 220° C. to obtain a polyethylene-2,6naphthalate film of 4.5 μm thick. During the continuous production of the film, it was very often broken. The physical properties of the film which was produced with difficulty are shown in Table 1.

The films in Examples 1 to 6 had no coarse protuberances of not less than 0.81 μm and very few drop outs were produced when they were manufactured into magnetic recording tapes. On the other hand, the film in Comparative Example 4 had as many as 100/200 cm$^2$ coarse protuberances of not less than 0.81 μm and when it was made into a magnetic recording tape, too many drop outs were produced to be put to practical use.

From these results it is to be understood that the films which are very thin and practicable are only those obtained in Examples 1 to 6.

less than 600 Kg./mm$^2$ in the transverse direction, said film consisting of polyethylene-2,6-naphthalate.

2. A polymer film for use as a support for high density magnetic recording tapes which has excellent heat resistance, a Young's modulus of not less than 800 kg/mm$^2$ in the machine direction and a Young's modulus of not less than 600 kg/mm$^2$ in the transverse direction, said film consisting of polyethylene-2,6-naphthalate in which is incorporated fine particles ranging in size from 0.001 to 10 μm in an amount ranging from 0 01 to 1 wt %.

3. The polyethylene-2,6-naphthalate film aooording to claim 1, wherein the surface roughness is not more than 0.008 μm.

4. The polyethylene-2,6-naphthalate film according to claim 1 or 2, wherein the thickness of said film is 2 to 7 μm.

5. A polyethylene-2,6-naphthalate film according to claim 1, wherein said film is produced by a process comprising the steps of:

melt-extruding polyethylene-2,6-naphthalate of an intrinsic viscosity of not less than 0.40 which contains 0.01 to 1 wt % of inactive fine particles having a primary particle diameter of 0.0001 to 10 μm into a film, stretching the film by 1.1 to 5.0 times in the machine direction at a temperature of 120° to 170° C., stretching the film by 2.5 to 5.0 times in the transverse direction at a temperature of 120° to 180° C., heatsetting the film at a temperature of 130° to 240° C. while subjecting the film to relaxation in the transverse direction by 1 to 30%, re-stretching the film in the machine direction at a temperature of 140° to 200° C. by 1.5 to 2.8 times if the film has been stretched in the machine direction by 1.1 to 3.5 times in the previous stage or by 1.05 to 1.35 times if the film has been stretched in the machine direction by 3.5 to 5.0 times in the previous stage, heatsetting the film at a temperature of 180° to 260° C., and winding the film while subjecting the film to relaxation by 1 to 10% in the machine direction and in the transverse direction.

6. The polyethylene-2,6-naphthalate film according to claim 1 or 2, wherein the polymer of said film has an intrinsic viscoisty (measured in a mixed solvent of phenol and 1,1,2,2-tetrachloroethane (1:1) at a temperature of 30° C.) of not less than 0.4.

TABLE 1

| | Base Film | | | | | |
|---|---|---|---|---|---|---|
| | Ra (μm) | Young's Modulus (kg/mm$^2$) | | Heat Shrinkage (%) | | Running Nature of Magnetic Tape Mounted on Apparatus |
| | | Machine Direction | Transverse Direction | Machine Direction | Transverse Direction | |
| Example 1 | 0.006 | 820 | 740 | 1.6 | 0.5 | Normal |
| Example 2 | 0.006 | 1020 | 730 | 1.8 | 0.3 | Good |
| Example 3 | 0.005 | 1350 | 720 | 1.9 | 0.2 | Very Good |
| Example 4 | 0.007 | 1350 | 720 | 1.9 | 0.2 | Very Good |
| Example 5 | 0.008 | 860 | 640 | 1.5 | 0 | Normal |
| Example 6 | 0.007 | 1070 | 600 | 2.0 | 0.2 | Good |
| Comparative Example 3 | 0.006 | 630 | 750 | 0.7 | 0 | Film is partially stretched. Bad |
| Comparative Example 4 | 0.006 | 1200 | 480 | 8 | 2 | Wrinkled at the edge portion. Bad |

What is claimed is:

1. A polymer film for use as a support for high density magnetic recording tapes which has excellent heat resistance, a Young's modulus of not less than 800 kg/mm$^2$ in the machine direction and a Young 's modulus of not 7. The polyethylene-2,6-naphthalate film according to claim 6, wherein said polymer has an intrinsic viscosity of 0.4 to 0.9.

8. The polyethylene-2,6-naphthalate film according to claim 2, wherein the size of said particles ranges from 0.001 to 3 μm and the quantity of said particles ranges from 0.02 to 0.8 wt. %.

9. The polyethylene-2,6-naphthalate film according to claim 1 or 2, wherein said film has a center line average roughness value (Ra) of not more than 0.008 μm with the surface of the film containing no protuberances of not less than 0.81 μm per 200 cm$^2$.

10. The polyethylene-2,6-naphthalate film according to claim 1 or 2, wherein the Young's modulus of the film in the machine direction if at least 1000 kg/mm$^2$ while the Young's modulus in the transverse direction of the film is not less than 650 kg/mm$^2$.

11. The polyethylene-2,6-naphthalate film according to claim 1 or 2, wherein said film has a density of not less than 1.360 g/cm$^3$.

12. The polyethylene-2,6-naphthalate film according to claim 1 or 2, wherein said film has a density not less than 1.370 g/cm$^3$.

13. The polyethylene-2,6-naphthalate film according to claim 4, wherein the thickness of said film ranges from 3 to 5 μm.

14. A process for producing a polyethylene-2,6-naphthalate film for high-density magnetic tapes being excellent in heat resistance and having a Young's modulus of not less than 800 kg/mm$^2$ in the machine directiona nd a Young's modulus of not less than 600 kg/mm$^2$ in the transverse direction, which comprises the steps of:

melt-extruding polyethylene-2,6-naphthalate of an intrinsic viscosity of not less than 0.40 which contains 0.01 to 1 wt % of inactive fine particles having a primary particle diameter of 0.001 to 10 μm into a film, stretching the film by 1.1 to 5.0 times in the machine direction at a temperature of 120° to 170° C., stretching the film by 2.5 to 5.0 times in the transverse direction at a temperature of 120° to 180° C., heatsetting the film at a temperature of 130° to 240° C. while subjecting the film to relaxation in the transverse direction by 1 to 30%, re-stretching the film in the machine direction at a temperature of 140° to 200° C. by 1.5 to 2.8 times if the film has been stretched in the machine direction by 1.1 to 3.5 times in the previous stage or by 1.05 to 1.35 times if the film has been stretched in the machine direction by 3.5 to 5.0 times in the previous stage, heatsetting the film at a temperature of 180° to 260° C., and winding the film while loosening the film by 1 to 10% in the machine direction and in the transverse direction.

15. A process according to claim 14, wherein said inactive fine particles are at least one member of fine particles selected from the group consisting of kaolin, talc, silica, magnesium carbonate, calcuim carbonate, barium carbonate, calcium sulfate, barium sulfate, lithium phosphate, calcium phosphate, magnesium phosphate, aluminum oxide, silicon oxide, titanium oxide, lithium fluoride, Ca, Ba, Zn and Mn salts of terephthalic acid and carbon blacks.

* * * * *